United States Patent [19]

Stanton

[11] Patent Number: 4,604,220

[45] Date of Patent: Aug. 5, 1986

[54] ALPHA OLEFIN SULFONATES AS CONVEYOR LUBRICANTS

[75] Inventor: James H. Stanton, Grosse Ile, Mich.

[73] Assignee: Diversey Wyandotte Corporation, Wyandotte, Mich.

[21] Appl. No.: 671,789

[22] Filed: Nov. 15, 1984

[51] Int. Cl.$^4$ ............................................ C10M 135/10
[52] U.S. Cl. ....................................... 252/33.4; 252/33; 252/49.3; 252/49.5
[58] Field of Search ....................... 252/33, 33.4, 49.3, 252/49.5

[56] References Cited

U.S. PATENT DOCUMENTS

| | | | |
|---|---|---|---|
| 2,760,934 | 8/1956 | Black | 252/33.4 |
| 2,883,340 | 4/1959 | Wasley et al. | 252/33 |
| 3,414,517 | 12/1968 | Mosier et al. | 252/49.3 |

*Primary Examiner*—Jacqueline V. Howard
*Attorney, Agent, or Firm*—Basile, Weintraub & Hanlon

[57] ABSTRACT

A conveyor cleaner-lubricant concentrate is derived from a concentrate of $C_{12}$ to $C_{18}$ alpha olefin sulfonate, and water or a water-soluble solvent. The sulfonate concentrate can be directly diluted with water to form a cleaner-lubricant. Alternatively, the sulfonate can be directly added to soap lubricants. The sulfonate-based lubricants are acid resistant and exhibit excellent lubricating and cleaning properties.

17 Claims, 2 Drawing Figures

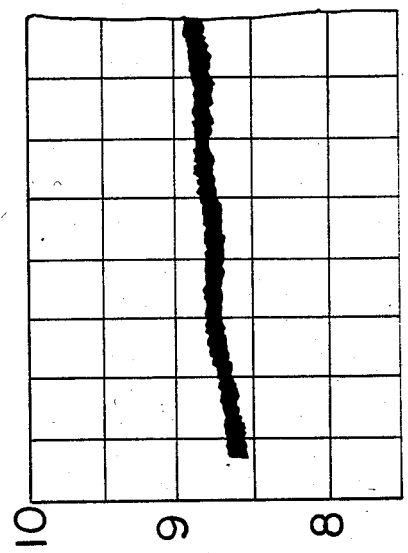
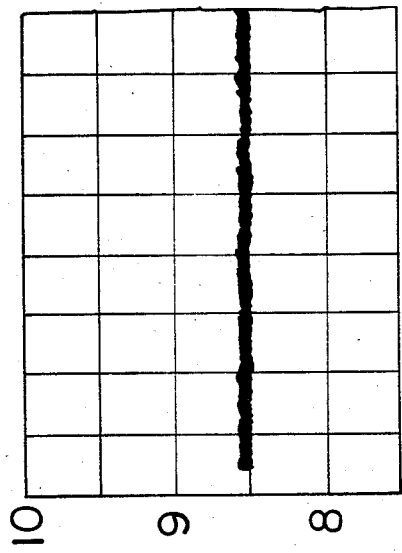
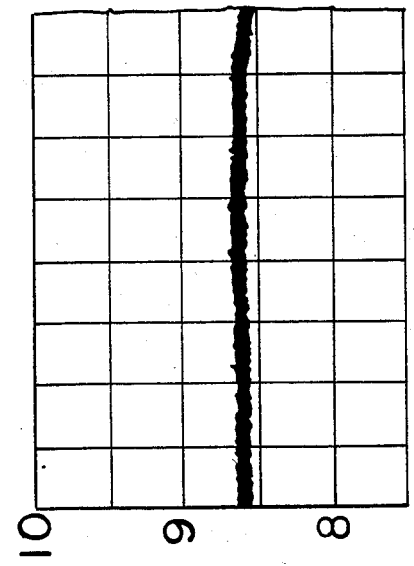
FIG-1　FIG-2

ALPHA OLEFIN SULFONATES AS CONVEYOR LUBRICANTS

BACKGROUND OF THE INVENTION

1. Field of the Invention

The present invention relates to conveyor lubricants. More particularly, the present invention concerns the use of alpha olefin sulfonates as conveyor lubricants. Even more particularly, the present invention concerns concentrates containing alpha olefin sulfonates and conveyor lubricants prepared therefrom.

2. Prior Art

In breweries, soft drink bottling operations and food processing plants, conveyors are used to move the bottles, jars, cans and the like along the line. In order to keep the conveyor chains clean and provide lubrication, it is customary to use a lubricant, such as an aqueous soap-based lubricant. The compositions, also, include chelating agents to prevent precipitation of calcium and magnesium soaps. These lubricants are, generally, manufactured and sold as concentrates which must, then, be diluted to, in general, about 1:100 with tap water at the point of use. However, prior to dilution, the concentrate is fed through proportioning pumps or injectors. It is important that the concentrated soaps, which tend to be very viscous, have their viscosity reduced. In the prior art, materials have been added to reduce viscosity of the concentrated lubricants, such as, propylene glycol, isopropyl alcohol, capric acid, neodecanoic acid, and fatty coconut acid. Additionally, surfactants, such as, alkoxylated alcohols have been employed to reduce viscosity. Such viscosity reducing compounds have inherent drawbacks, such as lubricity reduction; creation of additional precipitates, film deposition and the like.

While the art has readily accepted the use of water-soluble soaps as lubricants, they, in and of themselves, have certain disadvantages. First, and as noted above, when a soap is dissolved in hard water, it will precipitate as the calcium or magnesium salt of the fatty acid. This precipitate forms an undesirable greasy-type film.

Secondly, soaps lack resistance to acids. When contacted with an acid, the soap is converted back to the free fatty acid, which is insoluble. The free fatty acids, thus, will accumulate as a greasy soil on both the conveyor and the beverage container. This is quite often the case in pickle packing, as well as beer and soft drink bottling environments where the brine or beverage may overflow or the container, itself, may break.

Representative of prior art soap-based lubricants is found in U.S. Pat. No. 4,274,973 and U.S. Pat. No. 3,860,521.

The present invention, as will subsequently be detailed, obviates many of the drawbacks associated with the prior art.

SUMMARY OF THE INVENTION

The present invention provides a concentrate for forming a conveyor lubricant, as well as a conveyor lubricant, per se, formed from an alpha olefin sulfonate. The alpha olefin sulfonate contemplated for use herein may be the salt of potassium, sodium, ammonium, or amine of a $C_{12}$ to $C_{18}$ sulfonate, as well as mixtures thereof.

Generally, the concentrate will contain from about 2 to about 50 percent, by weight of the sulfonate. The concentrate balance will, generally, comprise a carrier for the sulfonate, usually, water. However, water soluble solvents such as alkanols, polyhydric alcohols, and other water soluble solvents may be admixed with the sulfonate, in lieu of water, or the concentrate may contain water and solvent. Likewise, adjuvants, such as surfactants, corrosion inhibitors, and the like may be admixed therewith.

The lubricant is formed by diluting the concentrate with water in a, respective ratio of from about one part of concentrate to fifty parts of water to one part of concentrate to one thousand parts of water.

The alpha olefin sulfonate may be added to typical soap-type lubricants, as well, to improve detergency and acid tolerance.

For a more complete understanding of the present invention reference is made to the following detailed description and accompanying examples.

BRIEF DESCRIPTION OF THE DRAWINGS

The figures of the drawings are charts comparing lubricity levels of various lubricant compositions.

DETAILED DESCRIPTION OF THE PREFERRED EMBODIMENTS

In accordance with the present invention and as noted hereinabove, conveyor cleaner-lubricants are prepared from alpha olefin sulfonates.

It has unexpectedly been discovered that conveyor lubricants having alpha olefin sulfonates incorporated therewith exhibit excellent hard water resistance and no tendency to precipitate in the presence of calcium or magnesium. In addition, alpha olefin sulfonate-based conveyor lubricants exhibit excellent acid resistance and very good soil removal. Additionally, such alpha olefin sulfonate cleaner-lubricants, generally, have a lower viscosity than concentrated water-based soap lubricants, as well as a much lower pH.

Alpha olefin sulfonates are well-known and commercially available products. Generally, they are available as an alkali metal salt. Usually, they are prepared by the sulfonation of a linear alpha olefin with $SO_3$, which is then subjected to hydrolysis with a strong caustic, such as sodium or potassium hydroxide.

Assuming sodium hydroxide as the caustic, the reaction proceeds as follows:

The alpha olefin sulfonates contemplated for use herein can be represented by the following formula:

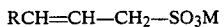

wherein M is either an alkali metal, amine or ammonium cation, as well as mixtures thereof, and R is an unsubstituted hydrocarbon radical ranging from $C_9$ to $C_{15}$, and mixtures thereof. Representative of the useful alkali metal cations are sodium and potassium, as well as mixtures thereof.

In practicing the present invention, the preferred alpha olefin sulfonate is a $C_{14}$ to $C_{18}$ sodium alpha olefin sulfonate, as well as mixtures thereof. Such compounds, as noted, are well known and commercially available, such as that sold by Stepan Chemical Co. under the name BIO-TERGE AS-40, which is a 40 percent aqueous solution of $C_{14}$ to $C_{16}$ sodium alpha olefin sulfonate, and that sold by Alcolac, Inc. under the name SIPONATE A-167, which is a 30 percent aqueous solution of $C_{16}$ to $C_{18}$ sodium alpha olefin sulfonate.

In preparing a conveyor cleaner-lubricant in accordance herewith, it is prepared from an alpha olefin solufonate concentrate. The concentrate is a solution of the alpha olefin sulfonate containing from about 5 percent, by weight, to about 50 percent, by weight, of the alpha olefin sulfonate and from about 50 to about 95 percent, by weight, of a carrier for the sulfonate. The concentrate is prepared by mixing together the sulfonate and the carrier, at room temperature. The preferred and usual carrier is water.

It is, also, possible, in accordance herewith, to use a water-soluble solvent, such as an alkanol or polyhydric alcohol as the vehicle or carrier for the sulfonate. Also, a water-soluble solvent may be admixed with water to define the vehicle carrier for the solvent.

Representative solvents include, for example, ethanol, proponol, butanol, ethylene glycol, propylene glycol, diethylene glycol and the like, as well as mixtures thereof.

Where the solvent is used, alone, or in admixture with water, the same amounts defined above, are employed.

The lube concentrate may, also, contain additional minor amounts of other ingredients, such as nonionic surfactants and anionic surfactants to improve cold water stability, as well as corrosion inhibitors, and the like. Generally, the surfactant, where employed, is present in an amount ranging from about 0.1 percent, by weight, to about 10 percent, by weight, based on the total weight of the concentrate. Preferably, the surfactant, where employed, is present in an amount ranging from about 0.5 percent, by weight to about 8 percent, by weight, based on the total weight of the concentrate.

Anionic surface active agents which may be employed include alkyl diphenyl oxide disulfonates, sodium N-methyl-N-alkyl-taurate, alkyl sulfonated amides, di(2-ethylhexyl)sulfosuccinate, dioctyl sodium sulfosuccinate, sodium sulfonate of oleic acid, anionic phosphate esters, alkyl ether sulfates, alkyl polyethyleneoxy esters, alcohol sulfates such as sodium lauryl sulfate, the product of chlorosulfonation of paraffin hydrocarbons, e.g., octadecenyl sulfonate and the condensate of a fatty acid chloride with an amine; carboxylates of ethyoxylated alcohols, and the like, as well as mixtures thereof.

Where an anionic surfactant is employed, it is ordinarily neutralized with any suitable compound, such as, sodium, ammonium or potassium hydroxide, or mono, di, and triethanolamine.

The nonionic surface active agents which are advantageously employed in the compositions of the invention are generally the polyoxyalkylene adducts of hydrophobic bases wherein the oxygen/carbon atom ratio in the oxyalkylene portion of the molecule is greater than 0.40. Those compositions which are condensed with hydrophobic bases to provide a polyoxyalkylene portion having an oxygen/carbon atom ratio greater than 0.40 include ethylene oxide, butadiene dioxide and glycidol, mixtures of these alkylene oxides with each other and with minor amounts of propylene oxide, butylene oxide, amylene oxide, styrene oxide, and other higher molecular weight alkylene oxides. Ethylene oxide, for example, is condensed with the hydrophobic base in an amount sufficient to impart water dispersibility or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates.

Typical hydrophobic bases which can be condensed with ethylene oxide in order to prepare nonionic surface active agents include mono- and polyalkyl phenols, polyoxypropylene condensed with a base having from about 1 to 6 carbon atoms and at least one reactive hydrogen atom, fatty acids, fatty amines, fatty amides and fatty alcohols. The hydrocarbon ethers such as the benzyl or lower alkyl ether of the polyoxyethylene surfactant condensates are also advantageously employed in the compositions of the invention.

Among the suitable nonionic surface active agents are the polyoxyethylene condensates of alkyl phenols having from about 6 to 20 carbon atoms in the alkyl portion and from about 5 to 30 ethenoxy groups in the polyoxyethylene radical. The alkyl substituent on the aromatic nucleus may be octyl, diamyl, n-dodecyl, polymerized propylene such as propylene tetramer and trimer, isoctyl, nonyl, etc. The benzyl ethers of the polyoxyethylene condensates of monoalkyl phenols impart good properties of the compositions of the invention and a typical product corresponds to the formula:

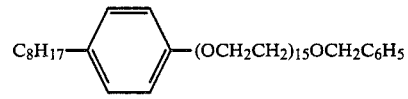

Higher polyalkyl oxyethylated phenols corresponding to the formula:

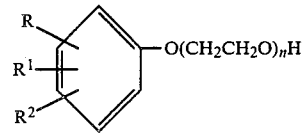

wherein R is hydrogen or an alkyl radical having from about 1 to 12 carbon atoms, $R^1$ and $R^2$ are alkyl radicals having from about 6 to 16 carbon atoms and n has a value from about 10 to 40, are also suitable as nonionic surface active agents. A typical oxyethylated polyalkyl phenol is dinonyl phenol condensed with 14 moles of ethylene oxide.

Other suitable nonionic surface active agents are cogeneric mixtures of conjugated polyoxyalkylene compounds containing in their structure at least one hydrophobic oxyalkylene chain in which the oxygen/carbon atom ratio does not exceed 0.40 and at least one hydrophilic oxyalkylene chain in which the oxygen/carbon atom ratio is greater than 0.40.

Polymers of oxyalkylene groups obtained from propylene oxide, butylene oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains having an oxygen/carbon atom ratio not exceeding 0.40. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide and styrene oxide are illustrative of hydrophilic oxyalkylene chains having an oxygen/carbon atom ratio greater than 0.40.

Further suitable nonionic surface active agents are the polyoxyethylene esters of higher fatty acids having from about 8 to 22 carbon atoms in the acyl group and from about 8 to 30 ethenoxy units in the oxyethylene portion. Typical products are the polyoxyethylene adducts of tall oil, rosin acids, lauric, stearic and oleic acids and the like. Additionally nonionic surface active agents are the polyoxyethylene condensates of higher fatty acid amines and amides having from about 8 to 22 carbon atoms in the fatty alkyl or acyl group and about 10 to 30 ethenoxy units in the oxyethylene portion. Illustrative products are coconut oil fatty acid amines and amides condensed with about 10 to 30 moles of ethylene oxide.

Other suitable polyoxyalkylene nonionic surface active agents are the alkylene oxide adducts of higher aliphatic alcohols and thioalcohols having from about 8 to 22 carbon atoms in the aliphatic portion and about 3 to 50 oxyalkylene portion. Typical products are synthetic fatty alcohols, such as n-decyl, n-undecyl, n-dodecyl, n-tridecyl, n-tetradecyl, n-hexadecyl, n-oxtadecyl and mixtures thereof condensed with 3 to 50 moles of ethylene oxide, a mixture of normal fatty alcohols condensed with 8 to 20 moles of ethylene oxide and capped with benzyl halide or an alkyl halide, a mixture of normal fatty alcohols condensed with 10 to 30 moles of a mixture of ethylene and propylene oxides, a mixture of several fatty alcohols condensed sequentially with 2 to 20 moles of ethylene oxide and 3 to 10 moles of propylene oxide, in either order; or a mixture of normal fatty alcohols condensed with a mixture of propylene and ethylene oxides, in which the oxygen/carbon atom ratio is less than 0.40 followed by a mixture of propylene and ethylene oxides in which the oxygen/carbon atom ratio is greater than 0.40 or a linear secondary alcohol condensed with 3 to 30 moles of ethylene oxide, or a linear secondary alcohol condensed with a mixture of propylene and ethylene oxides, or a linear secondary alcohol condensed with a mixture of ethylene, propylene, and higher alkylene oxides.

Suitable corrosion inhibitors include sodium nitrite and the like.

As noted hereinabove, the concentrate is prepared by mixing the components together at room temperature.

In preparing a conveyor lubricant from the concentrate, the concentrate is diluted with tap water to the extent that the lubricant, per se, will contain from about 0.005 percent, by weight, to about 0.1 percent, by weight, of alpha olefin sulfonate. Thus, the concentrate will be diluted with from about 50 parts to about 1000 parts of water per part of concentrate.

The so-prepared lubricants will have a pH, generally, ranging from about 7.5 to about 8.5. This is more acceptable when lubricating aluminum cans, paper containers or plastic bottles.

Additionally, these lubricants have a viscosity of about 5 centipoise at 75° F. and at 40° F.

Lubricants prepared herefrom remain clear in very hard water. Dilutions of 1/300 in 300 ppm hardness, as $CaCO_3$, have remained clear for extended periods in excess of 10 days.

The lubricants, in use, are applied by any conventional technique such as by spraying, immersion, and the like.

In addition to the preparation of concentrates and lubricants derived therefrom, it has further been found that the incorporation of an alpha olefin sulfonate into neutralized conventional fatty acid soap lubricants to enhance the acid resistance thereof. Thus, the present invention contemplates the improvement in such formulations by the incorporation of an alpha olefin sulfonate salt thereinto.

Typical neutralized fatty acid soap lubricants are, usually, can include linear alkyl sulfonic acid, such as dodecyl benzene sulfonic acid, linear allyl benzene sulfonic acid, etc., as well as from neodecanoic acid, the latter being defined in the above-referred to U.S. Pat. No. 4,274,973.

Likewise, conventional soap lubricants, such as those based on tall oil fatty acid are well known in the art. See, for example, U.S. Pat. No. 3,860,521.

Where the alpha olefin sulfonate is added to a neutralized fatty acid lubricant, it is present in an amount ranging from about 5 to about 25 percent, by weight, based on the total weight of the lubricant and, preferably, is present in an amount ranging from about 10 to about 15 percent, by weight, based on the total weight of the lubricant.

When incorporated into a soap lubricant, the alpha olefin sulfonate is present in an amount ranging from about 1 percent to about 5 percent, by weight, based on the total weight of the lubricant and, preferably, is present in an amount ranging from about 1½ percent, by weight, to about 3 percent, by weight based on the total weight of the lubricant.

Thus, the alpha olefin sulfonate can be used directly as a cleaner-lubricant or as an enhancement for other lubricants. It must be noted with respect hereto that where the sulfonate is used as an enhancement, it may be added directly into the lubricant, per se, or it may be added into a concentrate from which the lubricant is prepared.

For a more complete understanding of the present invention reference is made to the following examples. In the examples, which are to be construed as illustrations, rather than limitative of the invention, all parts are by weight, absent contrary indications.

EXAMPLE I

This example illustrates the preparation of a concentrate in accordance with the present invention.

A lubricant concentrate is prepared directly from 40 parts of sodium alpha olefin sulfonate having a carbon chain length of $C_{14}$ to $C_{16}$ and 60 parts of water. This is a commercially available product known as BIOTERGE AS-40.

EXAMPLE II

This example illustrates the preparation of a concentrate in accordance with the present invention.

Into a suitable vessel, equipped with agitation means is added the following:

| Ingredient | Amount |
| --- | --- |
| Water | 69 |
| AOS[1] | 30 |

-continued

| Ingredient | Amount |
|---|---|
| Nonionic Surfactant A[2] | 1 |

[1] 30 parts of BIO-TERGE AS-40 (effective amount of 12 parts of sodium alpha olefin sulfonate).
[2] a heteric ethylene oxide-propylene oxide adduct of a mixture of $C_{12}$ to $C_{18}$ monofunctional alcohols, defined in U.S. Pat. No. 3,770,701 and sold commercially by BASF Wyandotte Corporation under the name PLURAFAC B-26.

EXAMPLE III

Example II is repeated using the following formulation:

| Ingredient | Amount, pbw |
|---|---|
| Water | 69 |
| AOS[1] | 30 |
| Nonionic Surfactant[2] | 1 |

[1] present as 30 parts Siponate A-167
[2] same as in Example II

EXAMPLE IV

A concentrate suitable as a conveyor lubricant is prepared directly from 100 percent Siponate A-167, giving an effective amount of 30 parts sodium alpha olefin sulfonate having a $C_{16}$ to $C_{18}$ carbon chain length.

EXAMPLE V

Following the procedure of Example II, a concentrate is prepared from the following formulation:

| Ingredient | Amount, pbw |
|---|---|
| Water | 73.5 |
| AOS[1] | 20.0 |
| Anionic Surfactant[2] | 5.0 |
| Nonionic Surfactant[3] | 1.0 |
| Monoethanolamine[4] | 0.5 |

[1] BIO-TERGE AS-40
[2] a carboxylated ethylene oxide adduct of an alcohol sold commercially under the name Sandoz Sandopan LA8
[3] Same as Example II
[4] as a neutralizer for the anionic surfactant

EXAMPLE VI

This example illustrates the acid tolerance of an alpha olefin sulfonate lubricant, as compared to a soap lubricant.

A concentrate is prepared from 30 parts BIO-TERGE AS-40 and 70 parts of water.

One part of concentrate is, then, diluted with 100 parts of deionized water, as a control.

A comparable soap lubricant is prepared from a soap concentrate having the following formulation:

| Ingredient | Amount, pbw |
|---|---|
| Water | 58.3 |
| Nonionic Surfactant[1] | 2.0 |
| Isopropyl Alcohol | 7.0 |
| Tetrasodium EDTA 50% Liquid | 12.0 |
| Tall Oil Fatty Acid | 15.0 |
| Pottassium Hydroxide, 45% Liquid | 5.7 |
| | 100.0 |

[1] Ethoxylated nonyl phenol sold by Rohm & Haas under the name TRITON X-100.

This concentrate is, then, formulated into a lubricant using 1 part of the concentrate and 100 parts of deionized water, as a control.

To a first sample of each control lubricant is added 1 mls of 10 percent HCl. Then, to a second sample of each control lubricant is added 10 mls of 10 percent HCl.

The following table, Table I, shows the pH and the clarity of the lubricant for the controls and acidified lubricants.

TABLE I

| Lubricant | AOS pH | AOS Clarity | Soap pH | Soap Clarity |
|---|---|---|---|---|
| Control | 7.3 | Clear | 9.7 | Clear |
| Control + 1 ml 10% HCl | 3.8 | Clear | 8.8 | Cloudy |
| Control + 10 ml 10% HCl | 2.1 | Clear | 2.5 | Cloudy |

The "cloudy" condition of the lubricant indicates a tendency for excessive soil deposition on containers and conveyors.

EXAMPLE VII

This example illustrates the comparative lubricity properties of a lubricant in accordance with the present invention and of conventional lubricant.

A lubricant was prepared from a concentrate of 1 part of 100 percent Siponate A-167 which is admixed with 600 parts of tap water, to provide a lubricant containing 0.05 percent, by weight, of $C_{16}$ to $C_{18}$ sodium alpha olefin sulfonate.

Thereafter, a conventional lubricant was prepared by mixing 0.2 parts of sodium lauryl sulfate with 99.8 parts of deionized water to provide a lubricant containing 0.2 percent, by weight, of the sulfate.

Next, a concentrate was prepared, as in Example II (to make a 12 percent AOS concentrate). This concentrate is then diluted with tap water on a 1/200 ratio to provide a lubricant containing 0.06 percent, by weight, of $C_{14}$ to $C_{16}$ sodium alpha sulfonate.

Finally, a 0.08 percent fatty acid soap lubricant was prepared by diluting with tap water on a 1/200 ratio, the fatty acid soap concentrate having the formulation of Example VI.

Each of the lubricants is then tested for lubricity on a lubricity tester. The tester comprises a five foot section of a beverage bottle conveyor powered by a direct current DC motor. A constant speed controller is connected to the motor to measure the amperage. A Varian Recorder, Model 9176, is connected to the controller to record the power required to maintain constant speed. The recorder then records the changes in power as diluted lubricant is sprayed onto the conveyor, which is under a load of 12 bottles, each filled with water, and which are restricted from movement, such that the conveyor slides under the bottles, which remain stationary.

The figure appended hereto shows a first chart which is a comparison of the 0.05 percent AOS lubricant with the 0.2 percent sodium lauryl sulfate lubricant. The second chart compares the last two lubricants.

As seen in the first chart, the chart line for the sodium lauryl sulfate climbs higher, indicating poor lubricity, while the alpha olefin sulfonate lubricant chart line remains substantially level.

In the second chart, it is seen that while the soap-based lubricant has a lesser power requirement associated therewith, the alpha olefin sulfonate lubricant is quite comparable thereto. Thus, evidencing the excellent lubricating properties thereof.

EXAMPLE VIII

This example illustrates the preparation of a neutralized acid surfactant concentrate.

Into a suitable vessel, maintained at room temperature is added the following, with mixing:

| Ingredient | Amount, pbw |
|---|---|
| Water | 55.3 |
| Linear Alkyl Sulfonic Acid[1] | 3.0 |
| Nonionic Surfactant[2] | 1.0 |
| AOS[3] | 40.0 |
| Monoethanolamine | 0.7 |

[1] linear allyl benzene sulfonic acid
[2] same as Example I
[3] 40 parts BIO-TERGE AS-40 (effective as 16 parts of $C_{14}$ to $C_{16}$ sodium alpha olefin sulfonate)

When diluted with water in a ratio of one part of concentrate to 200 parts of water there is provided an excellent lubricant.

EXAMPLE IX

This example illustrates the preparation of a lubricant concentrate based on neodecanoic acid and having an alpha olefin sulfonate incorporated therewith.

Following the procedure of Example VIII, a concentrate is prepared from the following formulation:

| Ingredient | Amount, pbw |
|---|---|
| Water | 52.3 |
| Neodecanoic acid | 4.0 |
| Potassium hydroxide, 45% Liquid[1] | 2.7 |
| AOS[2] | 40.0 |

[1] as a neutralizer for the acid
[2] 40 parts BIO-TERGE AS-40 (effective as 15 parts of $C_{14}$ to $C_{16}$ sodium alpha olefin sulfonate)

EXAMPLE X

This example illustrates the formulation of a water-soluble soap lubricant concentrate having an alpha olefin sulfonate incorporated thereinto.

Into a suitable vessel, equipped with agitation means and heating means is charged 66.6 parts of water, 14.0 parts of water and 5.0 parts of water. While maintaining the vesel at 120° F. and under agitation there is added thereto 5.4 parts of potassium hydroxide. After the potassium hydroxide is added, 5.0 parts of tetrasodium ethylene diamine tetraacetate (as a 50 percent liquid) is added to the mixture. Finally, 4.0 parts of BIO-TERGE AS-40 is added to the mixture. After the addition is complete the vessel is allowed to cool, by standing, to room temperature to prepare the concentrate.

EXAMPLE XI

Example X was repeated, except that the alpha olefin sulfonate was eliminated and 70.6 parts of water were employed to prepare the concentrate.

EXAMPLE XII

A sample of each of the concentrates of Example X and Example XI were diluted with water to form a 1 percent solution of lubricant. One hundred mls of each lubricant was then added to a container. Each sample is, then, tested for acid tolerance by slowly adding to each sample, dropwise, 1 percent HCl until the sample turns cloudy.

After the addition of 2.6 mls of 1 percent HCl to the sample lubricant derived from the concentrate of Example X, the sample turns cloudy.

The sample lubricant derived from the concentrate of Example XI requires the addition of only 0.6 ml of 1 percent HCl before it turns cloudy, thus, evidencing the efficacy of the addition of the alpha olefin sulfonate.

EXAMPLE XIII

This example illustrates the preparation of a lube concentrate in accordance herewith.

Into a suitable vessel equipped with agitation means is added the following, with stirring:

| Ingredient | Amount, pbw |
|---|---|
| AOS[1] | 30.0 |
| Isopropanol | 70.0 |

[1] BIO-TERGE AS-40

The concentrate, when diluted with water, in a volumetric ratio of 1:200 provides an excellent cleaner-lubricant.

EXAMPLE XIV

This example illustrates the preparation of a lube concentrate in accordance herewith:

Into a suitable reaction vessel equipped with agitation means is added, with agitation, the following:

| Ingredient | Amount, pbw |
|---|---|
| AOS[1] | 40.0 |
| Propylene Glycol | 30.0 |
| Water | 30.0 |

[1] Siponate A-167

This concentrate, when diluted with water, in a volumetric ratio of 1:300 provides an excellent cleaner lubricant.

EXAMPLE XV

This example illustrates the preparation of a low-foaming lubricant concentrate for high speed conveyors in accordance with the present invention.

Into a suitable reaction vessel equipped with agitation means is added, with agitation, the following:

| Ingredient | Amount, pbw |
|---|---|
| AOS[1] | 30.0 |
| Nonionic Surfactant[2] | 4.0 |
| Water | 66.0 |

[1] BIO-TERGE AS-40
[2] a foam suppressant comprising a heteric ethylene oxide-propylene oxide adduct of a mixture of $C_{12}$ to $C_{18}$ monofunctional alcohols, defined in U.S. Patent No. 3,770,701 and sold commercially by BASF Wyandotte Corporation under the name PLURAFAC RA-40.

This concentrate, when diluted with water, in a volumetric ratio of 1:200 provides an excellent lubricant.

EXAMPLE XVI

This example illustrates the preparation of a lubricant concentrate having a corrosion inhibitor incorporated therewith and in accordance with the present invention.

Into a suitable reaction vessel equipped with agitation means is added, with stirring, the following ingredients:

| Ingredient | Amount, pbw |
|---|---|
| AOS[(1)] | 30.0 |
| Sodium Nitrite | 7.0 |
| Water | 63.0 |

[(1)]BIO-TERGE AS-40

This concentrate when diluted with water in a volumetric ratio of 1:200 provides an excellent lubricant.

Having, thus, described the invention, what is claimed is:

1. In a water-soluble lubricant concentrate of the type adapted to be admixed with water to form a lubricant for facilitating transportation of containers on a conveyor, the improvement comprising:
   (a) $C_{12}$ to $C_{18}$ alpha olefin sulfonates and mixtures thereof in an amount ranging between about 5 to about 50 percent by weight of the concentrate; and
   (b) a vehicle carrier for the sulfonate selected from the group consisting of water, a water-soluble solvent, or mixtures thereof present in an amount ranging between about 50 and about 95 percent by weight of the concentrate.

2. The improvement of claim 1 wherein the sulfonate corresponds to the formula:

$$RCH=CH-CH_2-SO_3M$$

wherein R is an unsubstituted organic radical having from 9 to 15 carbon atoms and mixtures thereof and M is selected from the group consisting of alkali metal, ammonium or amine cation, and mixtures thereof.

3. The improvement of claim 2 wherein M is sodium.

4. The improvement of claim 1 which further comprises a nonionic surfactant.

5. The improvement of claim 4 wherein the nonionic surfactant is a foam suppressant comprising an ethylene oxide-propylene oxide adduct of a $C_{12}$ to $C_{18}$ monofunctional alcohol and mixtures thereof.

6. The improvement of claim 1 which further comprises:
   an anionic surfactant.

7. The improvement of claim 1 which further comprises:
   a corrosion inhibitor.

8. The improvement of claim 7 wherein the corrosion inhibitor is sodium nitrite.

9. In a lubricating composition of the type adapted to be applied to a conveyor for facilitating transportation of containers disposed thereon, the improvement which comprises:
   the improvement of claim 1 and water in a volumetric proportion of concentrate to water of about 1:50 to about 1:1000.

10. In a lubricating composition of the type adapted to be applied to a conveyor for facilitating transportation of containers disposed thereon, the improvement which comprises:
    the improvement of claim 3 and water in a volumetric proportion of concentrate to water of about 1:50 to about 1:1000.

11. In an aqueous neutralized acid surfactant concentrate of the type comprising a fatty acid and water, the improvement which comprises:
    addition of the improvement of claim 1 in an amount between about 5 and about 25 percent by weight based on the total weight of the lubricant.

12. In an aqueous water-soluble soap lubricant concentrate, the improvement which comprises:
    addition of the improvement of claim 1 in an amount between about 5 and about 25 percent by weight based on the total weight of the lubricant.

13. In an aqueous water-soluble soap lubricant prepared by diluting with water a water-soluble soap concentrate, the improvement which comprises:
    adding to the soap concentrate between about 1 and about 5 percent the improvement of claim 1 based upon the total weight of the lubricant.

14. A method for lubricating a continuously moving conveyor system comprising:
    applying to the conveyor the improvement of claim 9.

15. A method for lubricating a continuously moving conveyor system comprising:
    applying to the conveyor the improvement of claim 10.

16. A method of lubricating a continuously moving conveyor system comprising:
    (a) forming a lubricating composition from the improvement of claim 11 by adding water thereto; and
    (b) applying the lubricating composition of (a) to the conveyor.

17. A method for lubricating a continuously moving conveyor system comprising:
    (a) adding water to the improvement of claim 12 to form a conveyor lubricant; and
    (b) applying the lubricant of (a) to the conveyor.

* * * * *